US005585707A

United States Patent [19]
Thompson et al.

[11] Patent Number: 5,585,707
[45] Date of Patent: Dec. 17, 1996

[54] TENDON SUSPENDED PLATFORM ROBOT

[75] Inventors: Clark J. Thompson, Webster; Perry D. Campbell, Jr., League City, both of Tex.

[73] Assignee: McDonnell Douglas Corporation, Huntington Beach, Calif.

[21] Appl. No.: 204,023

[22] Filed: Feb. 28, 1994

[51] Int. Cl.⁶ .................................................. H04N 5/30
[52] U.S. Cl. .................................. 318/568.2; 318/568.1; 405/224; 405/188; 414/729
[58] Field of Search .......................... 318/139, 560–646; 901/1, 3, 5, 7, 9, 13, 47, 50; 187/10; 182/136, 102; 414/11, 729; 114/337, 222; 299/8, 9; 180/901, 164; 405/224, 211, 203, 224.2, 191, 154, 217; 104/112, 138.2, 94, 89

[56] References Cited

U.S. PATENT DOCUMENTS

| | | |
|---|---|---|
| 2,004,133 | 6/1935 | Romano . |
| 3,014,984 | 12/1961 | Jacobson . |
| 3,261,223 | 7/1966 | Vertut . |
| 3,268,091 | 8/1966 | Melton . |
| 3,621,911 | 11/1971 | Baker ................................. 166/0.5 |
| 3,626,703 | 12/1971 | Richburg . |
| 4,502,407 | 3/1985 | Stevens ............................... 114/222 |
| 4,625,938 | 12/1986 | Brown . |
| 4,637,494 | 1/1987 | Iida et al. ............................ 187/10 |
| 4,666,362 | 5/1987 | Landsberger et al. . |
| 4,685,742 | 8/1987 | Moreau ................................ 299/8 |
| 4,710,819 | 12/1987 | Brown . |
| 4,732,525 | 3/1988 | Neumann . |
| 4,819,496 | 4/1989 | Shelef . |
| 4,850,631 | 7/1989 | Dotsko . |
| 4,873,571 | 10/1989 | Balet et al. . |
| 4,932,210 | 6/1990 | Julien et al. . |
| 4,976,582 | 12/1990 | Clavel . |
| 4,993,913 | 2/1991 | Ohtsuki . |
| 5,053,687 | 10/1991 | Merlet . |
| 5,114,300 | 5/1992 | Shahinpoor et al. . |
| 5,116,190 | 5/1992 | Silke . |
| 5,150,987 | 9/1992 | White et al. ......................... 405/224 |
| 5,156,062 | 10/1992 | Appleberry . |
| 5,203,646 | 4/1993 | Landsberger et al. ................ 901/1 |
| 5,224,426 | 7/1993 | Rodnusky . |
| 5,330,293 | 7/1994 | White et al. ......................... 405/211 |
| 5,351,621 | 10/1994 | Tanaka et al. ....................... 104/94 |
| 5,366,038 | 11/1994 | Hidetsugu et al. ................... 180/164 |

FOREIGN PATENT DOCUMENTS

| | | |
|---|---|---|
| 0094297 | 11/1983 | European Pat. Off. . |
| 2590-560 | 11/1985 | France . |
| 2647763 | 5/1989 | France . |
| 3804-572 | 8/1989 | Germany . |
| 1083-017 | 3/1984 | U.S.S.R. . |
| 1341-020 | 9/1987 | U.S.S.R. . |
| 1495-113 | 7/1989 | U.S.S.R. . |
| 1516-342 | 10/1989 | U.S.S.R. . |
| 1668784 | 8/1991 | U.S.S.R. . |
| 2210350 | 9/1987 | United Kingdom . |

OTHER PUBLICATIONS

E. F. Fichter, "A Stewart Platform–Based Manipulator; General Theory and Practical Construction," 5 The International Journal of Robotics Research (No. 2 Summer 1986) 157–182.

*Primary Examiner*—Paul Ip
*Attorney, Agent, or Firm*—Ronald L. Taylor

[57] ABSTRACT

A robot comprised of a platform, tendons and a control system. The platform contains proximal reels for the storage, retraction and extension of the tendons, with each tendon having a reel. The distal ends of the tendons are anchored at separate locations. The work space of the robot is primarily determined by the location of the tendon anchors, although it can be expanded by having pairs of tendons cross each other in between the platform and their distal anchor points. The platform is translated and rotated in the work space by controlling the lengths of the tendons extending from their respective reels. A master computer located on the platform controls each reel and coordinates their actuation. When used with at least six tendons and reels, the platform has six degrees of freedom: translation in three axes and rotation about each of the foregoing three axes. Numerous types of end effectors can be mounted on the platform, thus enabling the robot to perform a wide variety of tasks.

34 Claims, 6 Drawing Sheets

5,585,707

TENDON SUSPENDED PLATFORM ROBOT

BACKGROUND

1. Field of the Invention

The present invention relates to robotics and, more particularly, to a robot using tendons to position and orient a platform in a work space.

2. Description of the Prior Art

The shape of a robot has long been divorced from a form which is human-like, and presently is determined solely by the robot's function and the laws of physics. For many applications, the robot is nothing more than a platform which can be moved throughout a work space. An end effector mounted on the platform is designed to perform a specifics task, such as grasping loose articles or holding and manipulating a tool.

The generic problems are to position and properly orient the platform and attached end effector throughout the work space with speed and accuracy. Furthermore, the platform must not only be accurately positioned, but must be sufficiently rigid in that position so as to controllably apply the required force to the end effector or support the mass of a payload. Finally, the robot should be reconfigurable and portable so that it may perform tasks in work spaces of varying shapes, as well as in different locations.

There are a number of robotics apparatus which use tendons to position a platform in a work space, for example, U.S. Pat. No. 4,873,571 issued to Balet et al. Common to the tendon suspended platform robots of the prior art is the use of distal reels to control the position of the platform by controlling the length of the tendon extended from each reel. More particularly, the reels are respectively situated at the distal ends of the tendons located along the periphery of the work space, with the proximal ends of the tendons being attached to the moveable platform. This design requires suitable sites to allow for the secure anchoring of the distal reels.

The drawbacks inherent to such apparatus are difficulty In relocating the robot because each move requires moving and reanchoring each reel. Moreover, even changing the work space at the same location requires relocating at least one reel. As the size and weight of the distal reels are proportional to the size of the platform and the maximum force it may apply, the foregoing considerations effectively limit the portability and ability to reconfigure the robot, or the maximum force or payload of the robot. In essence, distal reels require a design compromise, and preclude the use of a tendon suspended platform robot for many applications.

Tendon suspended platform robots using distal reels typically provide only for the translation of the platform along three axes. Rotational degrees of freedom for the end effector are customarily provided by mounting a rotational apparatus on the platform which is gimbaled relative to the platform, and attaching the end effector to the rotational apparatus. However, this solution introduces a completely different device to the suspended platform, adding complexity to the physical apparatus as well as to the control system, which must coordinate the operation of the two apparatus.

SUMMARY OF THE PRESENT INVENTION

Briefly, the present invention is a robot comprised of a platform, tendons and a control system. The platform contains proximal reels for the storage, retraction and extension of the tendons, with each tendon having a reel. The distal ends of the tendons are anchored at separate locations. The work space of the robot is primarily determined by the location of the tendon anchors, although it can be slightly expanded by having pairs of tendons cross each other between the platform and their anchor points. The platform is translated and rotated in the work space by controlling the lengths of the tendons extending from their respective reels. A master computer located on the platform controls each reel and coordinates their actuation. When used with at least six tendons and reels, the platform has six degrees of freedom: translation in three axes and rotation about each of the foregoing three axes. Numerous types of end effectors can be mounted on the platform, thus enabling the robot to perform a wide variety of tasks.

As the reels are located on the platform, the anchors for the distal ends of the tendons may be structurally simple. In order to relocate the robot, the distal ends of the tendons need only be detached from their anchor points, the tendons taken up by their reels, and the platform transported to the new work site. Reconfiguration of the work space is similarly straightforward, requiring only the detachment of the distal ends of the tendons followed by their attachment to new anchor points at the same work site.

Both translation and rotation of the platform and the mounted end effector are obtained by controlling the lengths of the tendons extending from their respective reels. All of the reels are controlled by a control system located on the platform. The robot does not require a separate rotational device on the platform to orient the end effector relative to the work piece.

DESCRIPTION OF PREFERRED EMBODIMENTS OF THE INVENTION

Figure 1:
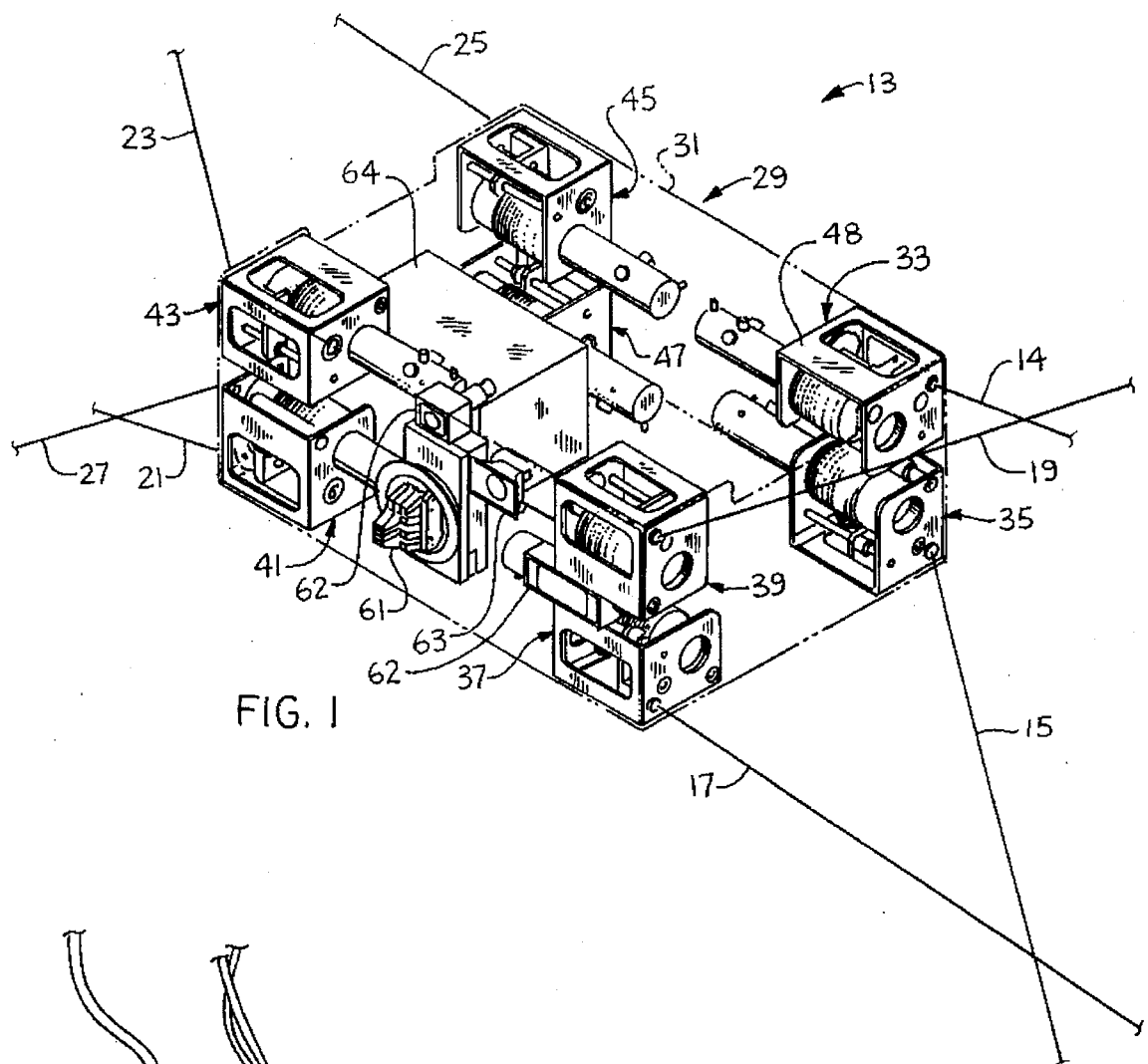
FIG. 1 illustrates an embodiment of the present invention having a platform suspended by eight tendons. The housing for the platform is shown in phantom so that the respective locations of the reels in the comers of the platform may be clearly seen.

FIG. 1 illustrates tendon suspended platform robot 13, a preferred embodiment of the present invention. Robot 13 is comprised of flexible tendons 14, 15, 17, 19, 21, 23, 25, and 27; and platform 29. The tendons are composed of either SPECTRA high modulus polypropylene or KEVLAR high modulus aramid. Platform 29 is comprised of housing 31 and the parts enclosed therein, including reels 33, 35, 37, 39, 41, 43, 45 and 47. All of the reels are identical.

Figure 2:
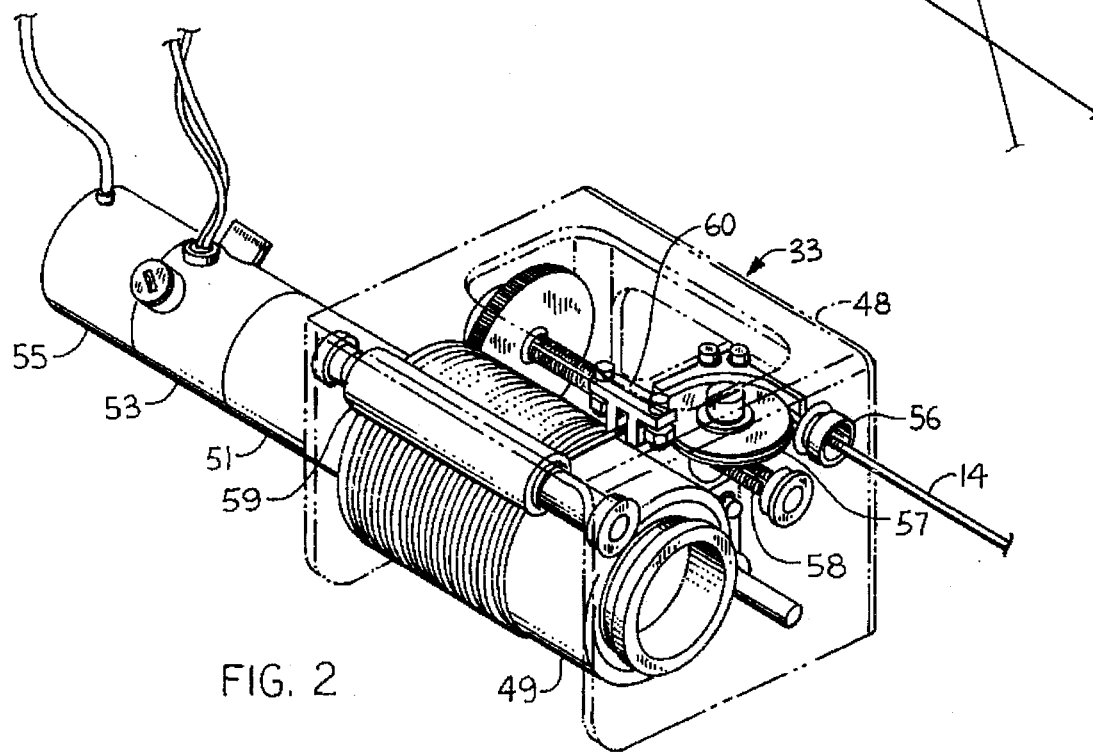
FIG. 2 is a perspective view of one of the reels of the platform shown in FIG. 1. The casing for the reel is shown in phantom so that the working parts may be clearly seen.

A perspective view of reel 33 is provided by FIG. 2. Reel 33 includes casing 48, which is shown in phantom. Located within casing 48 is rotatable spool 49, which provides for the storage, retraction and extension of tendon 14. The proximal ends of tendons 14. 15. 17, 19, 21, 23, 25 and 27 are attached to their respective spools. The distal ends of the tendons are anchored. The tendons are in tension: they are not rigid and thus cannot transmit a compressive load.

Spool 49 is cylindrical and is driven by fixed ratio gearbox 51, which is in turn driven by direct current motor 53. Incremental optical encoder 55 is connected to motor 53 and generates signals indicating the rotation of the motor shaft for motor 53. Tendon 14 passes through grommet 56 and into casing 48, whereupon it is guided around pulley 57 and stored on spool 49. As tendon 14 is retracted and stored on spool 49, lead screw 58 moves pulley 57 along spool 49 to ensure that tendon 14 is evenly fed onto and removed from spool 49. Pinch roller 59 prevents slack from occurring during the storage of tendon 14 on spool 49. Optical tension sensor 60 senses slack in the extended length of tendon 14, that is, In the portion of tendon 14 that is not stored on spool 49.

End effector 61 is mounted on platform 29. End effector 61 is a gripper for actuating buttons, switches, dials and the like. A different type of end effector designed for a different function may be similarly mounted on platform 29. Video cameras 62 and light 63 are mounted on platform 29 to provide the operator of robot 13 with a close-up view of end effector 61 and the work piece.

Figure 3:
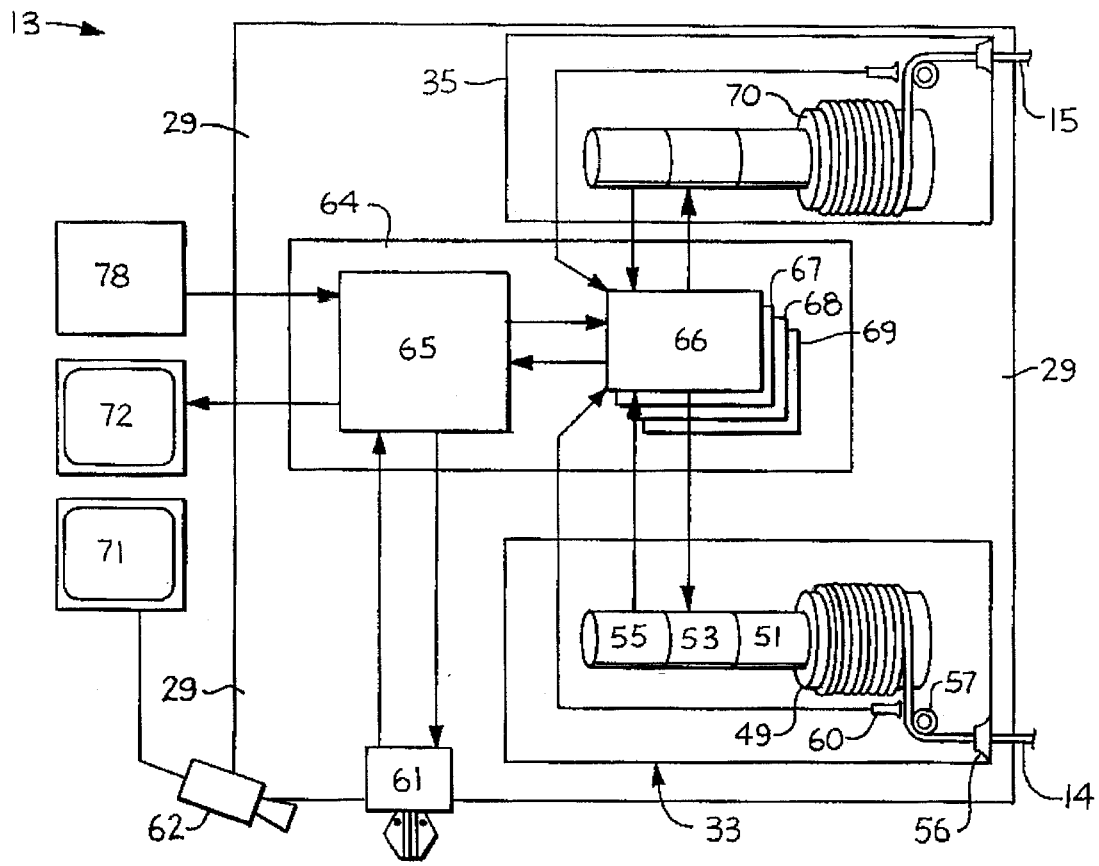
FIG. 3 is schematic drawing of the control system of an embodiment of the present invention.

Control unit 64 is contained within housing 31. Control unit 64 controls the length of the tendon extending from each reel by controlling the rotation of the spool for each reel, and also coordinates the rotation of all of the spools. As shown in the schematic drawing comprising FIG. 3, control unit 64 contains master computer 65 and spool motion controllers 66, 67, 68, and 69.

Spool motion controller 66 controls the rotation of spool 49 of reel 33, and the rotation of spool 70 of reel 35. Spools 49 and 70 are controlled and rotate independently of one another. Similarly, spool motion controller 67 controls the independent rotation of the spools for reels 37 and 39. Spool motion controller 68 controls the independent rotation of the spools for reels 41 and 43. Spool motion controller 69 controls the independent rotation of the spools for reels 45 and 47.

Master computer 65 is a Ziatech model 8902, type 486 PC microcomputer. Each spool motion controller is a Technology 80 model 4327B servo motor controller, which is an STD-compatible dual-axis digitally sampled direct current servo controller card.

Robot controls 78 transmit commands to master computer 65 for positioning and orienting platform 29 and for operating end effector 61. Robot controls 78 are operated by a human being. Alternatively, the operation of robot controls 78 may be automated. This alternative mode would allow robot 13 to automatically perform tasks cyclically over an extended period of time without requiring a human presence.

In addition to the commands from robot controls 78, master computer 65 receives spool position information for each of the spools from each spool motion controller. This includes the spool position change required to initially extend each tendon from its completely stored position on its spool to the extended length required to anchor its distal end and initially suspend and position platform 29 in the work space. Operator commands and the spool position information are used in kinematics equations well known to those skilled in the art to generate spool rotation commands in the form of digital signals respectively transmitted to each of the spool motion controllers. Master computer 65 also relays operator commands to, and feedback from, end effector 61.

Based on the digital signal from master computer 65, spool motion controller 66 computes and transmits the appropriate voltage to motor 53 for spool 49 of reel 33. Motor 53 then responsively rotates spool 49, resulting in the appropriate extension or retraction of tendon 14 and a resultant change in the length of tendon 14 extending from spool 49. Incremental optical encoder 55 generates a signal indicating the amount of rotation of the motor shaft of motor 53. This signal is transmitted to spool motion controller 66, where it is used to compute the rotative position of spool 49 relative its position when tendon 14 is completely stored thereon.

Optical tension sensor 60 uses an optocoupler to optically detect slack in the extended length of tendon 14. More particularly, optical sensor 60 is comprised of a light emitting diode and an opposing photo transistor. When the extended length of tendon 14 is taut, tendon 14 blocks the beam of infrared light emitted from the diode from impinging on the photo transistor. If the extended length of tendon 14 becomes slack, it moves out of the path of the infrared light beam and the beam then impinges on the photo transistor. The photo transistor responds to impingement of infrared light by producing a signal current which is transmitted to spool motion controller 66. Should spool motion controller 66 receive a slack signal from optical tension sensor 60, it will override a tendon extension command prevent extension and command retraction of tendon 14 until the slack is taken up and the slack signal stops.

The other reels and their spools operate and interact with their respective spool motion controllers in the identical manner as set out herein with respect to reel 33, spool 49 and spool motion controller 66. Video cameras 62 provide video signals to video monitor 71. Master computer 65 provides a position signal to digital position display 72 to further aid the operator in guiding end effector 61.

Figure 4:
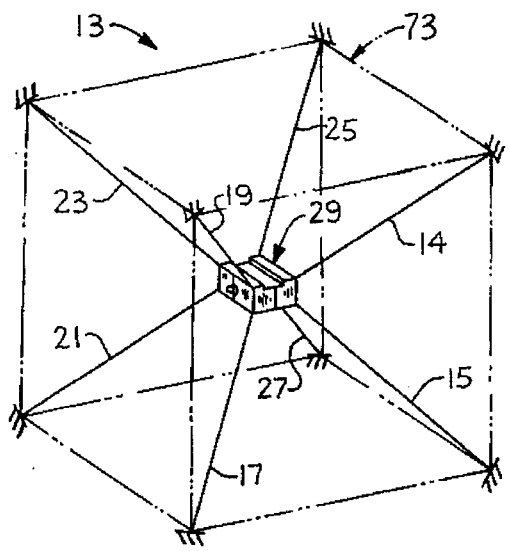
FIG. 4 illustrates a rectangular work space for the embodiment having eight tendons.
Figure 5:
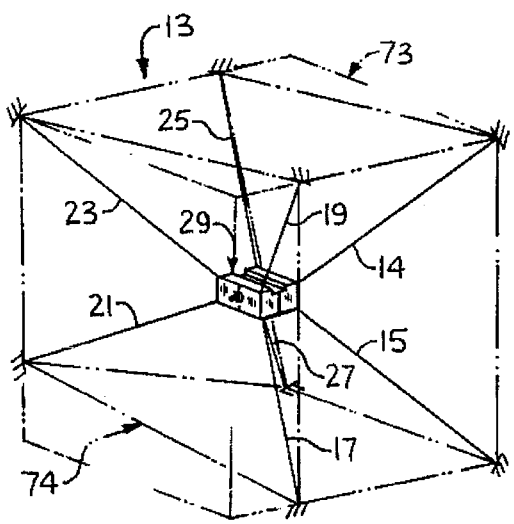
FIG. 5 depicts a work space having an irregular shape, for the same embodiment shown in FIG. 4. The workspace is derived from the rectangular workspace of FIG. 4 by changing the anchor points for four of the eight tendons.

FIG. 4 shows the distal ends of tendons 14, 15, 17, 19, 21, 23, 25, and 27 anchored so as to define cubic work space 73 for robot 13. Note that the tendons of robot 13 do not cross each other. FIG. 5 shows irregular work space 74 obtained by moving the anchors for the distal ends of tendons 17, 19, 21 and 25 from their positions for cubic work space 73. The anchors for the distal ends of tendons 14, 15, 23 and 27 remain in the same locations they had for work space 73. The tendons remain uncrossed. To facilitate comparison, the comers for work space 73 also are shown in phantom in FIG. 5.

Figure 6:
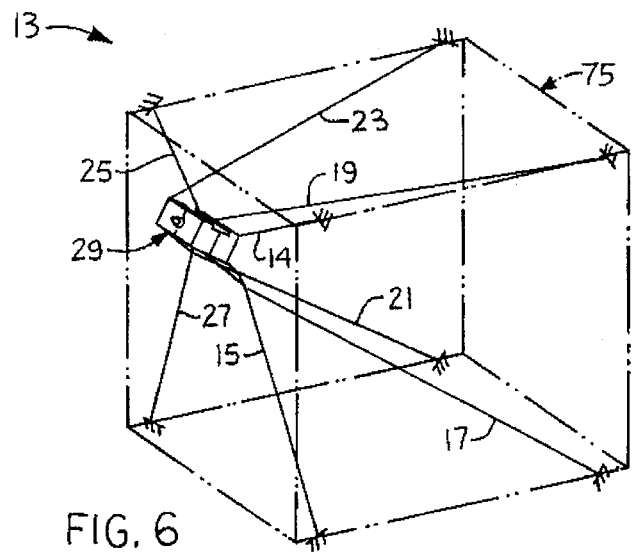
FIG. 6 shows the how the rectangular work space previously shown in FIG. 4 can be expanded beyond the planes formed by the anchor points solely by varying the configuration of the tendons.

FIG. 6 shows robot 13 having work space 75 (shown in phantom). The anchor points for the tendons of robot 13 are the same for work space 75 as they were for cubic work space 73 (shown in FIG. 4). However, the tendons for robot 13 are crossed in FIG. 6, in contrast to the uncrossed tendons for robot 13 having cubic work space 73. The crossed tendons increase the range of motion for platform 29 over the range of motion for platform 29 where the tendons are uncrossed, and thereby expand its work space. Thus work space 75 extends beyond the anchor points for the tendons.

FIG. 6 also shows that tendons 15 and 17 bend where they cross each other, as do tendons 21 and 27. The flexibility of the tendons allows the crossing tendons to bend around each other, and thereby enables platform 29 to obtain the expanded range of motion shown as work space 75.

Figures 7A, 7B:
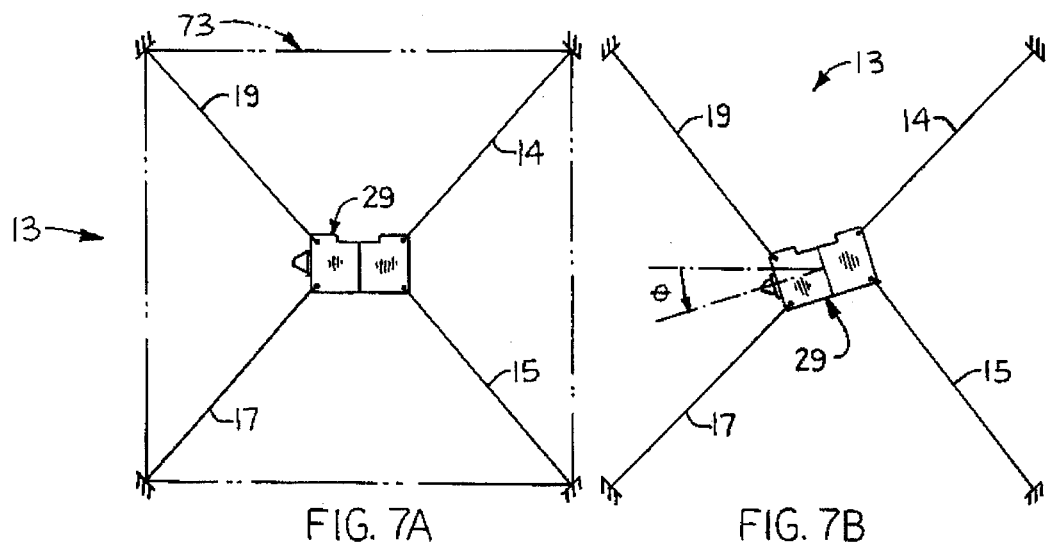
FIG. 7A is a side view of the robot shown in FIG. 4 wherein the tendons are in an uncrossed configuration. The platform is in a neutral, nonrotated orientation.
FIG. 7B shows the robot in FIG. 7A with its platform rotated to its maximum pitch angle θ.

FIG. 7A is a side view of robot 13 in cubic work space 73, as previously shown in FIG. 4. The tendons are not crossed. Work space 73 is shown in phantom. Platform 29 is in a neutral, nonrotated orientation. FIG. 7B shows how platform 29 can be rotated about a horizontal axis through a maximum pitch angle θ by changing the extended lengths of the tendons.

Figures 8A, 8B:
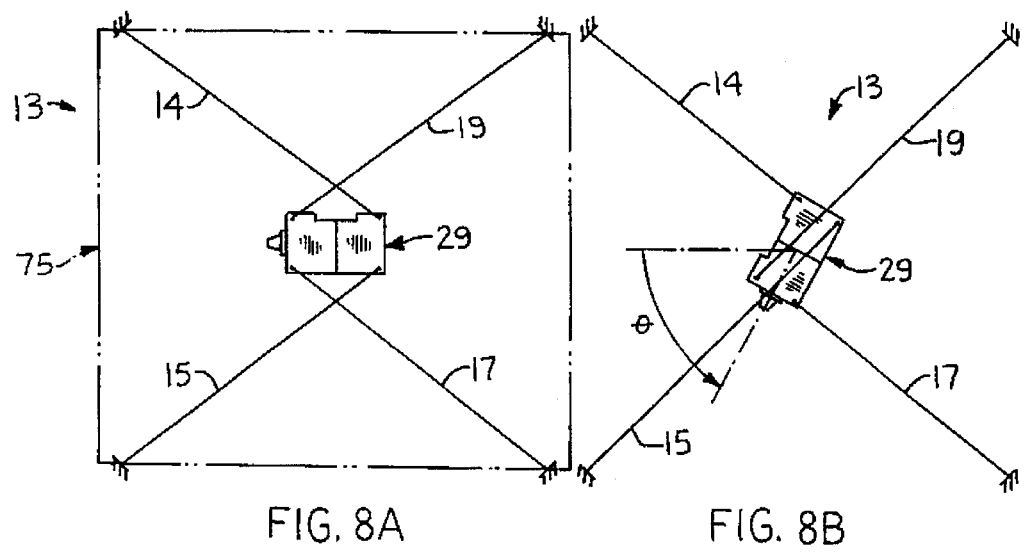
FIG. 8A is a side view of the robot shown in FIGS. 1 and 6 wherein the tendons are in a crossed tendon configuration. The platform is in a neutral, nonrotated orientation.
FIG. 8B shows the robot in FIG. 8A with its platform rotated to its maximum pitch angle θ.

FIG. 8A is a side view of robot 13 in which the tendons are in a crossed configuration. Expanded work space 75 (shown in phantom) is obtained by virtue of the crossed tendon configuration. Platform 29 is in a neutral, nonrotated orientation. FIG. 8B shows how platform 29 can be rotated about its pitch axis through a maximum pitch angle θ by changing the extended length of the tendons.

Comparison of the maximum pitch angles respectively shown in FIGS. 7B and 8B demonstrates that the maximum pitch angle θ can be substantially increased by changing the tendon configuration from the uncrossed configuration of FIG. 4 to a crossed configuration. Crossing the tendons in other configurations will similarly maximize the available rotation of platform 29 about its yaw and roll axes. The crossed tendon configuration also allows end effector 61 to apply greater force against a work piece than the force that can be applied using the uncrossed tendon configuration.

Figure 9:
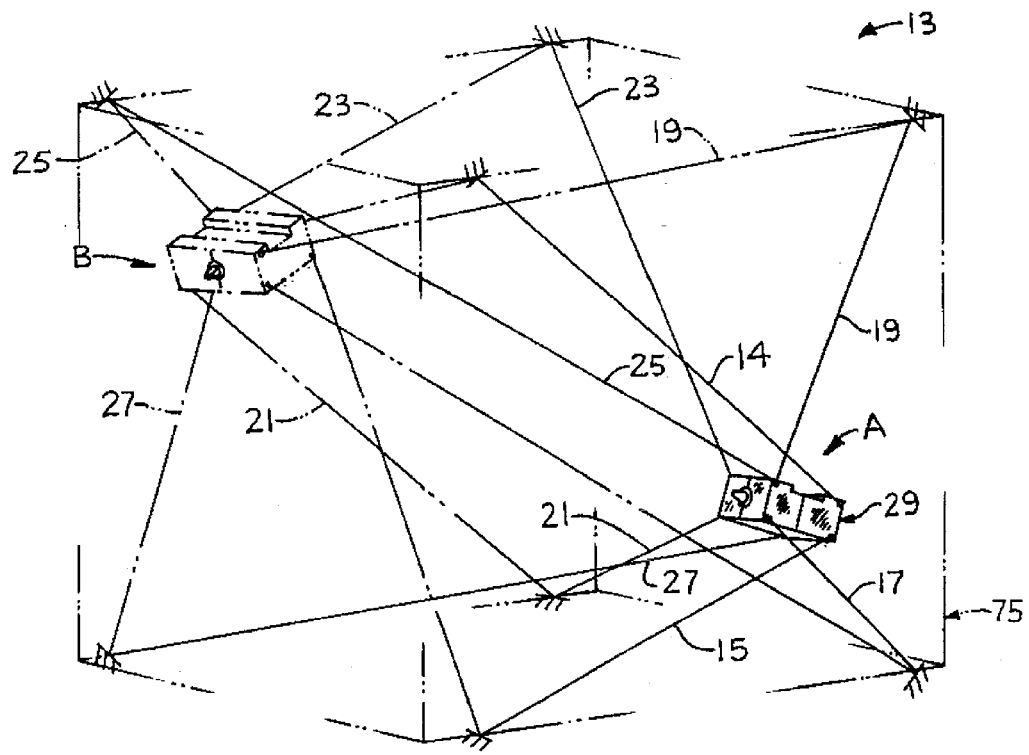
FIG. 9 is a perspective view of the robot shown in FIG. 6 wherein the tendons are in a crossed configuration. Six degrees of freedom are demonstrated by the platform being shown in two different positions (one of the positions being illustrated in phantom).

FIG. 9 shows platform 29 of robot 13 in two positions: A and B. Position B is shown in phantom. The tendons for robot 13 are in the crossed configuration. FIG. 9 illustrates the six degrees of freedom of robot 13. More particularly, it shows how platform 29 is translated in the work space and its orientation is varied by changing the extended lengths of the tendons. The comers of work space 75 are shown in phantom. Work space 75 is expanded beyond the planes including the tendon anchor points by virtue of the crossed tendon configuration, as previously discussed in conjunction with FIGS. 6 and 8A.

Figure 10:
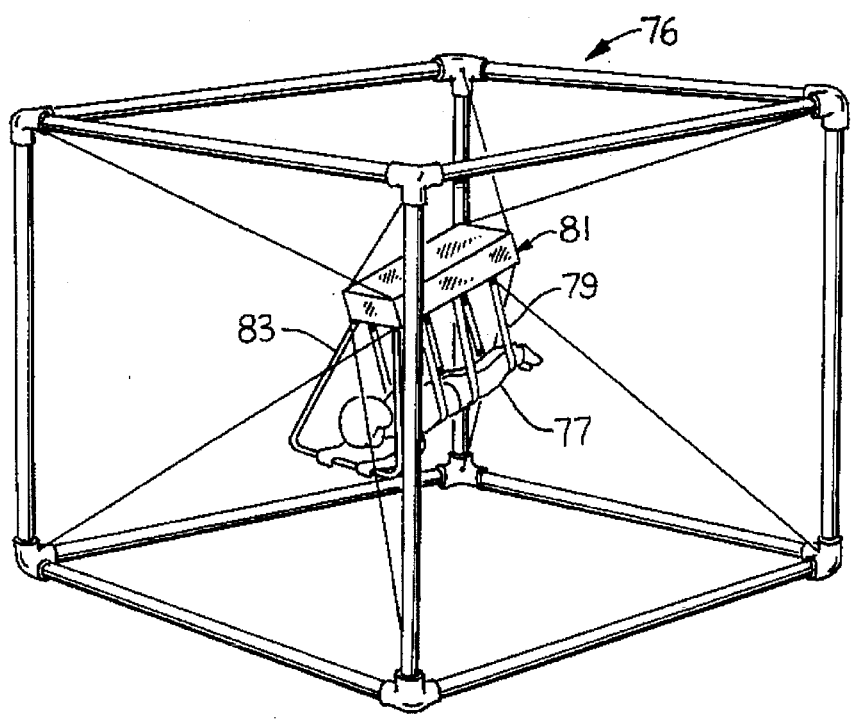
FIG. 10 is a perspective view of an embodiment of the present invention providing a pilot with the virtual reality of flying a hang glider.

The size of the robot of the present invention and the type of end effector mounted thereon may be changed to enable the robot to be used in a wide variety of applications. For example, FIG. 10 illustrates how robot 76 of the present invention would provide pilot 77 with the motion sensation of flying a hang glider. Harness 79 suspending pilot 77 comprises the end effector attached to platform 81 of robot 76. The virtual reality of flying a hang glider would be achieved by programming the master computer in platform 81 to change the orientation and position of platform 81 and harness 79 in the work space responsive to the movement of control bar 83 by pilot 77, in conjunction with appropriate audio and video simulations and possibly a fan to provide the tactile feel of wind.

Figure 11:
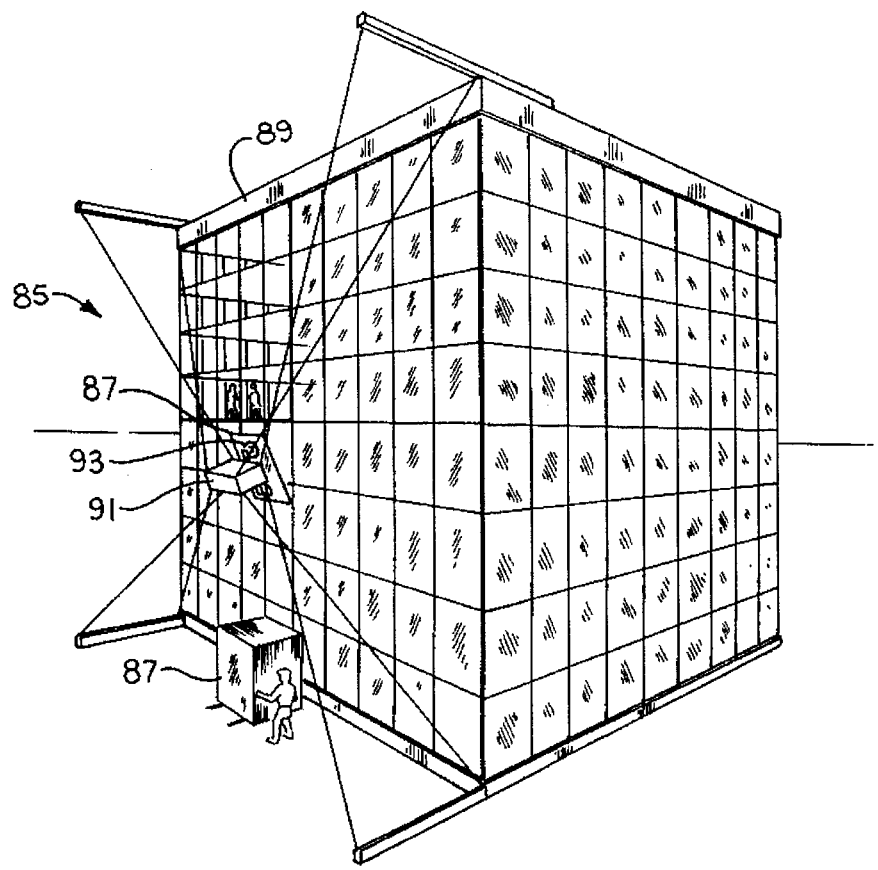
FIG. 11 is a perspective view of an embodiment of the present invention placing glass panels onto the superstructure of a building under construction.

Another possible application for the robot of the present invention is shown in FIG. 11, which illustrates how robot 85 would be used to place glass panels 87 on the superstructure of building 89, which is under construction. The end effector mounted on platform 91 of robot 85 includes suction cups 93. Each panel 87 would be picked up and transported using suction cups 93, and then released when the panel is secured in place.

Figure 12:
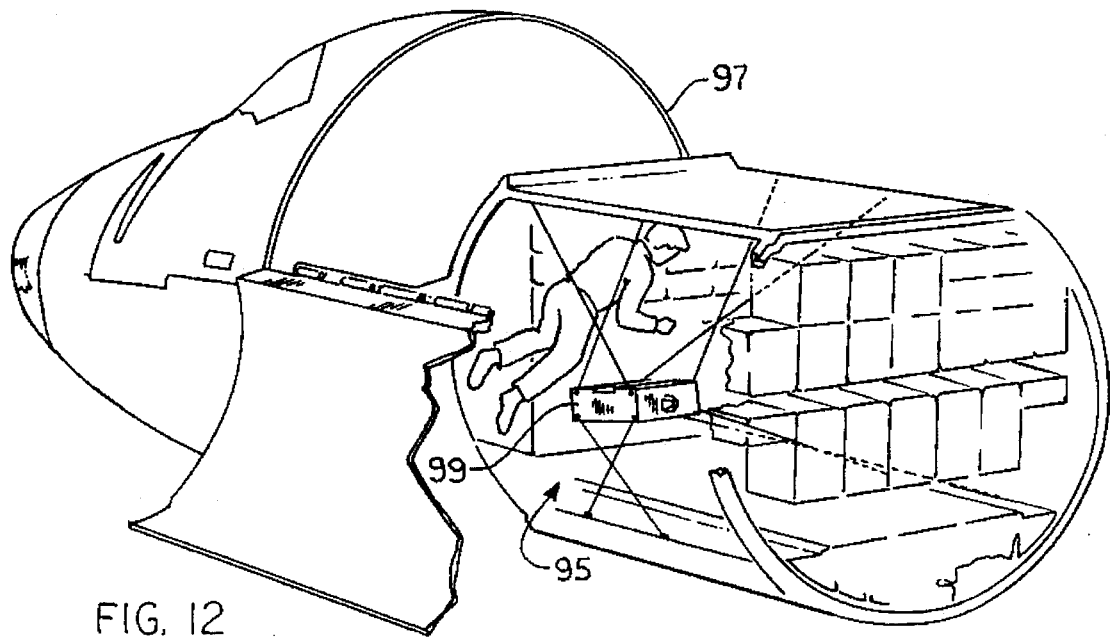
FIG. 12 is a perspective view of an embodiment of the present invention being used inside a space vehicle.

FIG. 12 illustrates how robot 95 of the present invention would perform tasks on board space vehicle 97. Robot 95 includes platform 99. The robot of the present invention can function as intended in the absence of gravity. The placement of reels on platform 99 rather that at the distal ends of the tendons would allow robot 95 to be used in the typically cramped quarters of space vehicle 97. The portability of robot 95 would similarly lend itself to this application.

As previously discussed in detail, the length of each tendon lying between the platform and its anchor point (called the extended length for robot 13) is a controlled variable. Controlling the variable tendon lengths may be accomplished in a number of ways besides the reel and spool apparatus described in connection with robot 13. For example, the tendons could be comprised of a material such as nitinol, a binary alloy comprised of nickel and titanium, which reversibly expands and contracts as a function of its temperature. The temperature is typically controlled by controlling an electric current passing through the material. Dynalloy, Inc., of Irvine, Cali. produces a proprietary brand of nitinol called FLEXINOL.

Figure 13:
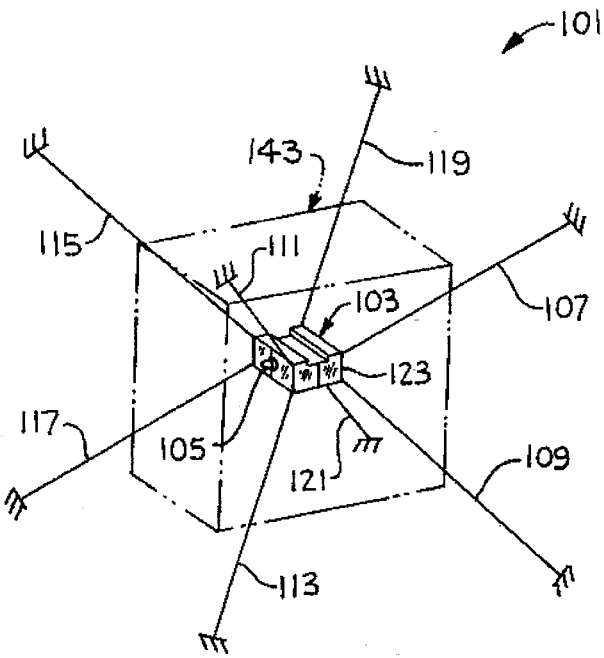
FIG. 13 is a perspective view of another embodiment of the present invention having a platform suspended by eight tendons. The length of each tendon of this embodiment varies as a function of the electric current passing through the tendon.
Figure 14:
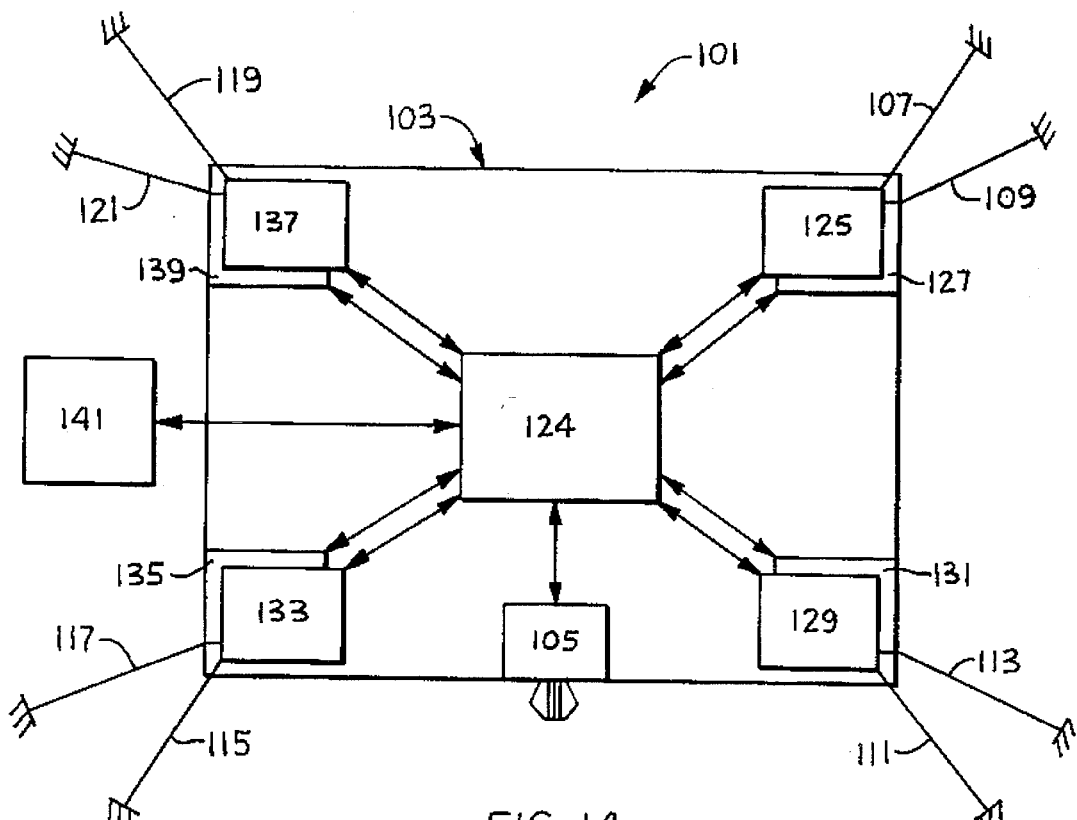
FIG. 14 is a schematic drawing of the embodiment shown in FIG. 13.

FIG. 13 shows tendon suspended platform robot 101, another preferred embodiment of the present invention. FIG. 14 is a schematic drawing of robot 101. Robot 101 is comprised of platform 103, end effector 105, and flexible tendons 107, 109, 111, 113, 115, 117, 119 and 121. The tendons are composed of nitinol, a binary alloy comprised of nickel and titanium that reversibly changes its shape as a function of temperature.

Platform 103 is comprised of housing 123 and the parts enclosed therein, including master computer 124 and control modules 125, 127, 129, 131,133, 135, 137, and 139. The foregoing control modules are respectively attached to and control tendons 107, 109, 111, 113, 115, 117, 119 and 121. The control modules are attached to the proximal ends of the tendons they control. The distal ends of the tendons are anchored to neighboring structure or the ground.

The temperature of each tendon, and thus its length, is controlled by passing an electric current through it. Electric current is produced by each control module. The amperage produced by each control module is controlled and coordinated by master computer 124. Robot controls 141 transmit commands to master computer 124 for translating and orienting platform 103 and for operating end effector 105.

In addition to the commands from robot controls 141, master computer 124 receives information regarding the length of each tendon from its respective control module. Operator commands and the tendon length information are used in kinematics equations well known to those skilled in the art to generate control module commands in the form of digital signals respectively transmitted to each of the control modules. Master computer 124 also relays operator commands to, and feedback from, end effector 105.

Each control module translates the digital signal from master computer 124 into an amperage that will cause its attached tendon to assume a responsive length. This could cause a given tendon to increase or decrease its length, or possibly maintain the same length. The overall effect of the changes in lengths of the tendons commanded by master computer 124 is to translate and orient platform 103 in accordance with the commands from robot controls 141.

Presently, a tendon made from nitinol cannot change its length more than approximately ten percent from its original length. Thus, given the same tendon lengths, platform 103 would not have the range of motion available to platform 29 of robot 13. Moreover, working space 143 for robot 101 lies inside the cube formed by the planes which include the anchor points for the distal ends of the tendons. Despite the foregoing limitations, the dramatic decrease in weight of robot 101 over a robot of the present invention using mechanical apparatus to control the extended lengths of the tendons might make this embodiment desirable in some situations. Advancements in the maximum length change of shape-changing alloys could make this alternative much more viable.

While a number of exemplary embodiments of the invention have been shown and described, such embodiments are merely illustrative of the invention and do not restrict its breadth. Moreover, changes, modifications and substitutions to the embodiments shown and described may be made by persons having ordinary skill in the art without departing from the spirit and scope of the invention. The scope of the invention is limited only by the following claims.

What is claimed is:

1. A robot comprising:

a platform;

a plurality of flexible tendons tier suspending said platform, each of said tendons having a proximal end and o distal end, the distal end of each tendon being anchored to a predetermined anchor point wherein the anchored distal ends of some of the plurality of tendons are disposed above the platform, and the anchored distal ends of others of the plurality of tendons are disposed below the platform, to thereby create a workspace bounded by the anchored distal ends of the tendons and surrounding the platform within which the platform may be maneuvered by retraction and extension of one or more of the flexible tendons;

reel means located on said platform for storing, retracting and extending said tendons; and means located on said platform for controlling said reel means, whereby said tendons may be retracted or extended in order to suspend, translate, and orient said platform as desired.

2. The tendon suspended robot recited in claim 1 wherein: the proximal ends of said tendons are attached to said reel means, whereby said platform is suspended in said work space when said distal ends are anchored and said tendons are made taut by said reel means.

3. The robot recited in claim 1, wherein said reel means comprises a plurality of reels, each of which is adapted for storing, retracting and extending one of said tendons.

4. The robot recited in claim 3 wherein:

each of said reels is adapted for generating a position signal responsive to the retraction and extension of said tendon;

said control means is adapted for receiving operative commands for translating and orienting said platform, and for controlling said reel means responsive to said operative commands and said position signals, whereby said platform is adapted to be translated and oriented in compliance with said operative commands.

5. The robot recited in claim 4, wherein:

each of said reels includes means for generating a slack signal indicating slack in said tendon; and said control means is adapted to respond to said slack signal by commanding the reel from where said slack signal originates to cease extending said tendon and to retract said tendon until said slack signal stops, whereby a motion command from said control means to extend said tendon is adapted to be countermanded until said tendon is taut.

6. The robot recited in claim 5 wherein said slack signal generating means is an optical tension sensor.

7. The robot recited in claim 4 wherein said plurality of said tendons is comprised of at least three of said tendons.

8. The robot recited in claim 4 wherein:

said plurality of said tendons consists of at least six of said tendons, whereby said platform has six degrees of freedom.

9. The robot recited in claim 4 wherein:

said plurality of said tendons comprises eight of said tendons;

whereby when pairs of the extended lengths of said tendons are crossed, the platform has a greater range of motion than when none of the extended lengths of said tendons are closed.

10. The robot recited in claim 4 wherein said plurality of said tendons is comprised of least a number that provides said platform with six degrees of freedom.

11. The robot recited in claim 22 further comprising:

an end effector mounted on said platform; and said control means being capable of receiving an effector command for said end effector and relaying said effector command to said end effector.

12. A robot comprising:

a platform;

a plurality of tendons for suspending said platform, the tendons each having a distal end which is anchored to a predetermined anchor point, the anchored distal end of at least one of the tendons being diposed above said platform and the anchored distal end of at least one of the tendons being disposed below said platform, to thereby create a generally cubic workspace defined by the anchored distal ends of said plurality of tendons within which the platform is disposed;

each of said tendons including a tendon length having a dimension which is variable and controllable;

means for controlling said tendon lengths, said control means being adapted for receiving operative commands for translating and orienting said platform, and for controlling each of said tendon lengths responsive to said operative commands;

each of said tendons having a proximal end and a distal end; and said proximal ends being attached to said platform, whereby said platform is suspended when said distal ends are anchored and said tendon lengths are made taut, and is translated and oriented in compliance with said operative commands.

13. The robot recited in claim 12 and further comprising:

means for determining the respective dimensions of said tendon lengths;

whereby said control means is adapted for additionally controlling each of said tendon lengths responsive to the dimensions of said tendon lengths.

14. The robot recited in claim 13 wherein said control means is located on said platform.

15. The robot recited in claim 13 wherein:

said tendon length varies as a function of its temperature; and further comprising means for individually regulating the temperature of each of said tendon lengths.

16. The robot recited in claim 15 wherein:

said temperature regulator is comprised of said tendon being connected to a source of electric current, whereby said control means controls said tendon length by controlling the electric current running through said tendon.

17. The robot recited in claim 15 wherein:

said plurality of said tendons consists of at least six of said tendons, whereby said platform has six degrees of freedom.

18. The robot recited in claim 13 wherein said plurality of said tendons is comprised of at least three of said tendons.

19. The robot recited in claim 13 wherein:

said plurality of said tendons comprises eight of said tendons;

whereby when pairs of the extended lengths of said tendons are crossed, the platform has a greater range of motion than when none of the extended lengths of said tendons are crossed.

20. The robot recited in claim 13 wherein said plurality of said tendons is comprised of least a number that provides said platform with six degrees of freedom.

21. The robot recited in claim 20 further comprising:

an end effector mounted on said platform; and said control means being capable of receiving an effector command for said end effector and relaying said effector command to said end effector.

22. A robot comprising:

a platform;

a plurality of flexible tendons, each having a total length comprised of a variable extended length and a variable stored length, and each tendon further having a distal end attached to a predetermined anchor point and a proximal end attached to said platform, the number of tendons being sufficient to ensure six degrees of freedom of motion for the platform;

a plurality of spool devices, each said spool device being adapted for storing the stored length of a corresponding one of said tendons and for varying the extended length of the corresponding tendon; and a controller adapted to control each of said spool devices so that the extended length of each tendon is controlled and coordinated to position said platform at a desired location.

23. The robot recited in claim 22 wherein said plurality of said tendons is comprised of at least three of said tendons.

24. The robot recited in claim 22 wherein:

said plurality of said tendons comprises eight of said tendons;

whereby when pairs of the extended lengths of said tendons are crossed, the platform has a greater range of motion than when none of the extended lengths of said tendons are crossed.

25. The robot recited in claim 22 wherein said control means includes at least one spool motion controller for controlling said spool devices.

26. The robot recited in claim 25 wherein said spool motion controller is an STD-compatible dual-axis digitally sampled direct current servo controller card, for controlling up to two of said spool means.

27. The robot recited in claim 25 wherein said control means includes a master computer connected to said spool motion controller.

28. The robot recited in claim 27 wherein said control means is located on said platform.

29. The robot recited in claim 25 further comprising:

a plurality of reels; wherein each of said reels includes one of said spool devices and means for generating a motion signal responsive to motion of said spool means relative to said reel; and means for transmitting said motion signal to said spool motion controller of said spool devices included in said reel.

30. The robot recited in claim 29 wherein:

said control means includes a master computer for receiving operative commands for translating and orienting said platform;

said at least one spool motion controller being adapted to generate a position signal responsive, respectively, to said motion signal from each of said reels;

said master computer being adapted to generate motion commands for each of said spool devices responsive to said operative commands and said position signals; and said at least one spool motion controller being adapted to control said spool devices responsive to said motion commands, whereby said platform may be translated and oriented in compliance with said operative commands.

31. The robot recited in claim 30 wherein:

each of said reels includes means for generating a slack signal indicating slack in said tendon; and said at least one spool motion controller is adapted to respond to said slack signal by commanding said spool devices included in said reel from where said slack signal emanated to cease extending said tendon and to retract said tendon until said slack signal stops, whereby a motion command from said master computer to extend said tendon is adapted to be overridden until said tendon is taut.

32. The robot recited in claim 31 wherein said slack signal generating means is an optical sensor.

33. The robot recited in claim 30 further comprising: an end effector mounted on said platform; and said master computer being capable of receiving an effector command for said end effector and relaying said effector command to said end effector.

34. The robot recited in claim 22 wherein said plurality of spool devices are adapted to keep the extended lengths of said tendons in tension when said distal ends are anchored.

* * * * *